Figure 3:
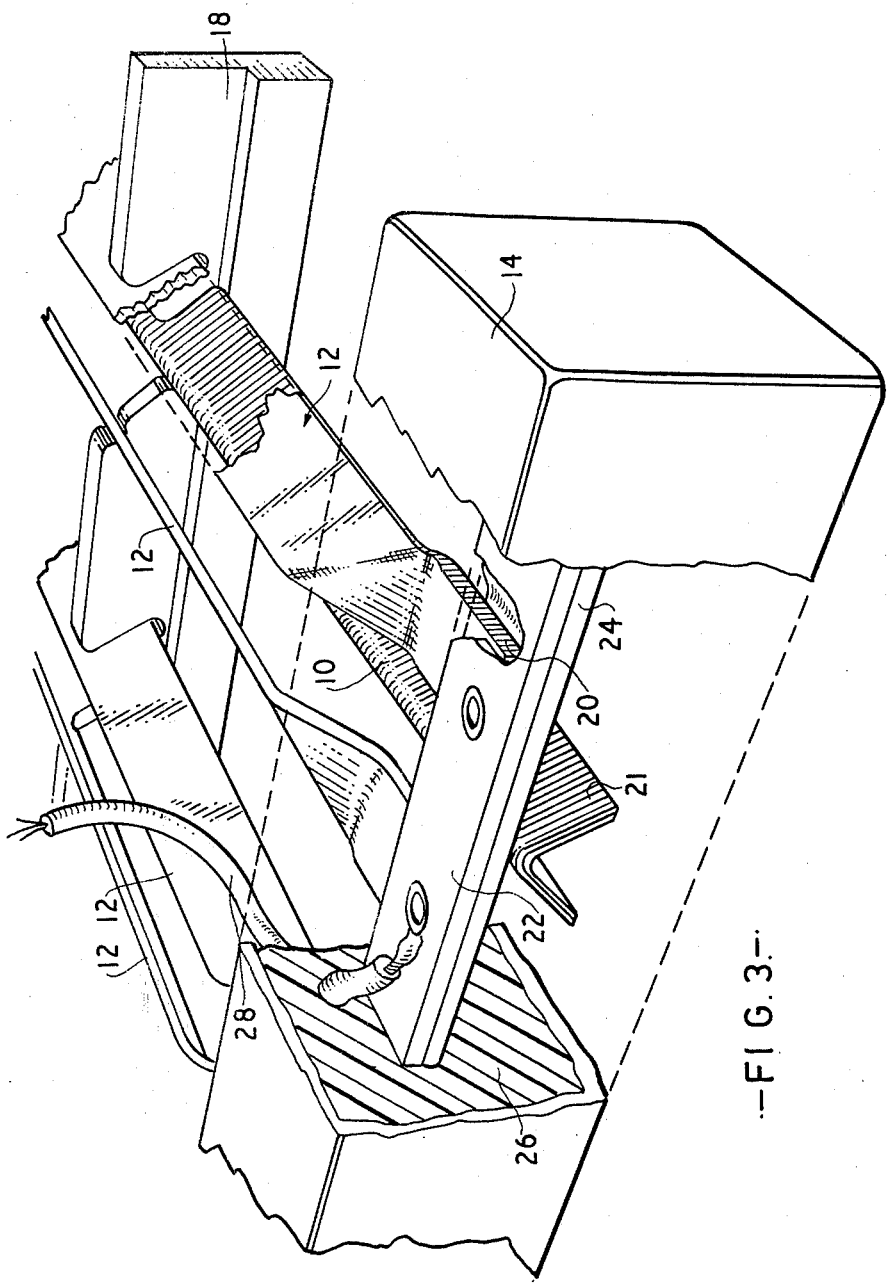

United States Patent

Barrett

[11] 3,969,216
[45] July 13, 1976

[54] FLOTATION SEPARATION
[76] Inventor: Doreen Veronica Barrett, Hill View, Davenport Road, Heswall, Merseyside, England
[22] Filed: Dec. 27, 1974
[21] Appl. No.: 536,765

[52] U.S. Cl. ............................ 204/286; 204/149; 204/278; 204/281; 204/290 F
[51] Int. Cl.² ...................... C25B 9/00; C25B 9/02
[58] Field of Search ............... 204/290 F, 278, 288, 204/252, 286, 149, 280, 281

[56] References Cited
UNITED STATES PATENTS

| | | | |
|---|---|---|---|
| 398,101 | 2/1889 | Webster, Jr. | 204/149 |
| 744,171 | 11/1903 | Davis et al. | 204/149 |
| 1,579,138 | 3/1926 | Petz | 204/275 X |
| 3,505,188 | 4/1970 | Pan | 204/149 |
| 3,766,037 | 10/1973 | Lee | 204/149 X |
| 3,847,783 | 11/1974 | Giacopelli | 204/275 |
| 3,869,312 | 3/1975 | Moss et al. | 204/290 F X |
| 3,875,043 | 4/1975 | Franks et al. | 204/290 F |

*Primary Examiner*—John H. Mack
*Assistant Examiner*—A. C. Prescott
*Attorney, Agent, or Firm*—Fred Philpitt

[57] ABSTRACT

The present specification describes and claims an electrode assembly which comprises a frame member carrying a plurality of anodes and cathodes, each anode and cathode comprising a metal rod or strip. One end of at least some of the anodes is joined to a connecting bar or wire and one end of at least some of the cathodes is joined to a further connecting bar or wire wherein the resulting junctions are covered with a water resistant resin. The electrodes are prevented from contacting electrodes of opposite polarity by insulating means provided at the end of each electrode remote from said junctions.

12 Claims, 4 Drawing Figures

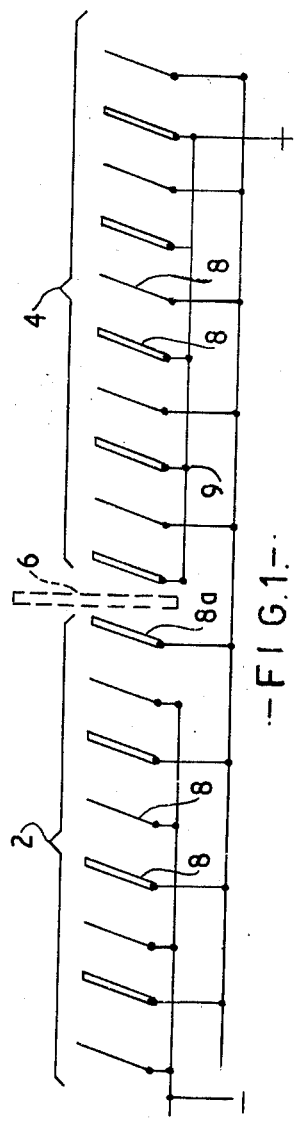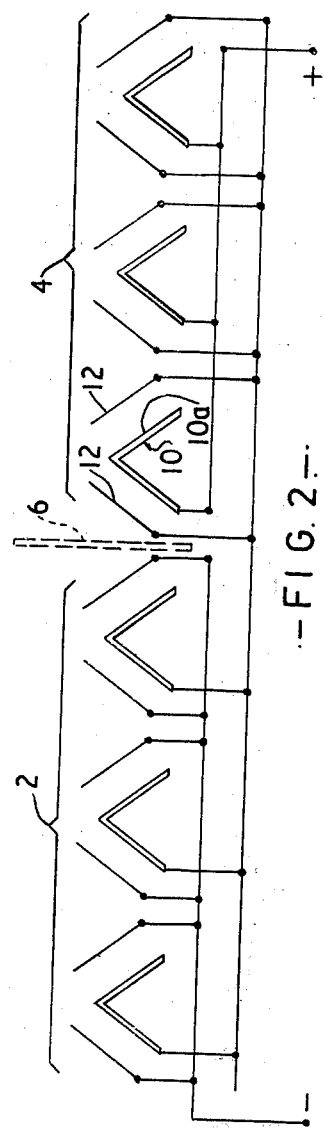

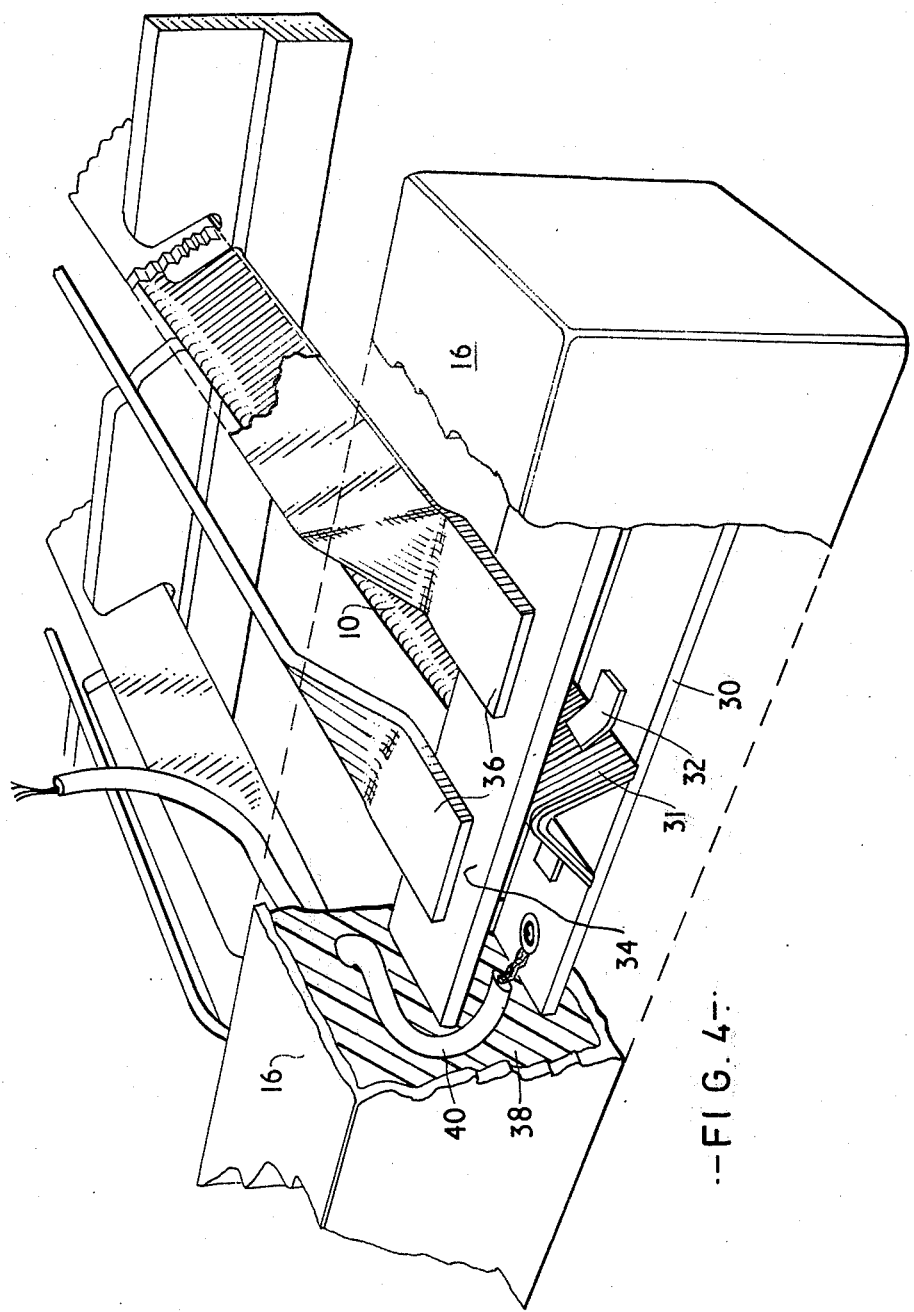

FLOTATION SEPARATION

The present invention relates to a electrode assembly for the separation of finely divided particles of solid matter suspended in a liquid.

The separation is produced by the present invention by the use of gaseous bubbles rising through the liquid, the gaseous bubbles being caused by electrolysis of the liquor or solution in which the solid particles are dispersed.

Flotation separation has been known for a considerable time but has suffered from a number of disadvantages.

Unless the anodes when used in such a process are made of expensive non-corroding materials they may tend to deteriorate rapidly. Since these electrodes are immersed in the liquid to electrolise the liquid, the electrical connections to the electrodes are difficult to make so as to give good integrity.

In known separation apparatus the electrodes are constructed from large perforated or expanded sheets of metal mounted one above the other and it is generally necessary to replace the complete assembly when deterioration takes place. In addition because of the use of perforated or expanded metal sheets some of the solid material can fall onto the electrodes causing blockage and thus reducing the efficiency. Furthermore since the electrodes at present in use have large areas any metallic or conducting materials which fall into the liquid can cause a short circuit thus causing an immediate stoppage. A further disadvantage of the use of large area electrodes is that large currents are employed at relatively low voltages, thus requiring heavy duty connections.

The present invention is directed to an electrode assembly which attempts to overcome the above mentioned disadvantages.

According to the present invention there is provided an electrode assembly comprising a frame member carrying a plurality of anodes and cathodes, each anode and cathode comprising a metal rod or strip, one end of at least some of the anodes being joined to a connecting bar or wire and one end of at least some of the cathodes being joined to a connecting bar or wire wherein the resulting junctions are covered with a water resistant resin, the electrodes being prevented from contacting electrodes of opposite polarity by insulating means provided at the end of each electrode remote from said junctions.

In a preferred embodiment of the present invention the frame member has two channel sections on opposite sides of the frame member, the junctions between the anodes and a connecting bar being located in one channel section together with the free ends of the cathodes, and the junctions between the cathodes and a connecting bar being located in the other channel section together with the free ends of the anodes. The channel sections are filled with a thermosetting resin which seals the electrical junctions from contact with the liquid to be processed and also assists in mechanically aligning the electrodes themselves into the desired configuration.

The insulating means takes the form of a separator member i.e. a strip of insulating material, which is located within each channel section between the anode and cathode ends, the separator member being embedded within the water resistant resin. The separator member may be actually fixed to the frame member.

In an electrode assembly constructed according to the present invention the electrodes, particularly the anodes, can be made of relatively weak materials such as lead or lead alloys or alternatively desired metal coatings may be applied to relatively light metal support sections. The coatings may be either sprayed onto the support sections, applied by dipping the support sections, or electro-chemically deposited depending on the materials and costs involved. The coating may be for example titanium, titanium oxide (rutile), lead alloys, lead dioxide and tin alloys.

The electrode assembly of the present invention can be made small in comparison to the area of liquid to be treated and thus permits a plurality of such electrode assemblies to be placed side by side and wired in series. In such an arrangement a spacer or baffle plate can be fitted between each assembly to ensure that if a metallic or conducting object should fall onto the electrodes only one assembly is short circuited and the remainder can function as normal.

The present invention will now be further described, by way of example with reference to the accompanying drawings, in which:

FIG. 1 shows a schematic cross-sectional view of one embodiment of the present invention, FIG. 2 shows a schematic cross-sectional view of a further embodiment of the present invention, and FIGS. 3 and 4 illustrate cutaway parts of opposite corner regions of the electrode assembly of FIG. 2.

Referring to FIG. 1, two electrode assemblies 2 and 4 are shown separated by spacer screen 6. The two assemblies are shown wired in series and the circuit can be extended to cover more than two electrode assemblies. The elongate electrodes 8 are shown at an inclined angle in FIG. 1 and it can be seen that if some of the solid materials in the liquid being treated fall onto the electrodes 8 they would tend to pass between the electrodes 8 rather than stay on the upper surface which is very small in comparison to the face area of the electrodes 8. The spacer screen 6 which is isolated from the electrode assemblies 2 and 4 projects upwards, as viewed in FIGS. 1 and 2, from between the electrode assemblies and extends beyond the upper edges of the electrodes 8. Thus, it can be seen that if a large metal object falls into the liquid the spacer screen 6 by virtue of standing up higher than the upper edge of the electrodes 8 would cause the metal object to fall onto only one of the electrode assemblies and would only cause a short circuit in one of the assemblies. The remaining assembly could then carry on as before.

FIG. 2 shows an alternative embodiment of electrode assembly constructed according to the present invention wherein inverted V-shaped anodes 10 are employed, each anode being provided with two elongate cathodes 12. The longitudinal axis of each cathode 12 extends substantially parallel to the apex of each inverted V-shaped anode 10 and the plane of the major part of each cathode 12 is substantially parallel to the plane of an adjacent face 10a of an associated inverted V-shaped anode 10. Thus, each pair of cathodes 12 provides an effective roof over an anode 10 preventing large metal objects from shorting out the electrode assembly. The shaping of these electrodes in this way assists the directing of material falling through the liquid between the electrodes, thus minimising the risk of short circuiting. In addition the electrodes (10,12) in the configuration shown in FIG. 2 can be made of perforated material which would minimise still further the risk of short circuits.

If desired each electrode assembly itself can be wired into sections. For example instead of having all the anodes connected to a single wire in a channel down one side of the frame member and the cathodes joined to a wire down the other side of the frame member. They can be arranged so that the wire down one side of the frame member has a break in the middle thereof so that the electrodes attached to the wire down the other channel can be in effect a floating electrode. This type of arrangement can be easily seen from FIG. 1 if the spacer screen 6 were removed together with anode 8a. The whole of zones 2 and 4 could then be regarded as a single electrode assembly wherein half of the electrodes connected together by a wire 9 are effectively at zero potential relative to the other electrodes which are at a positive or negative potential with respect thereto.

FIGS. 3 and 4 illustrate in detail the electrode arrangement at each end of the electrode assembly schematically illustrated in FIG. 2, a similar arrangement (not illustrated) existing in the embodiment of FIG. 1. The electrode assembly comprises a frame member formed from two channel sections 14 and 16 (FIGS. 3 and 4 respectively) which are arranged substantially parallel to each other, a number of electrode supports 18, and a number of elongate sections (not illustrated) which extend between the channel sections 14 and 16.

Considering FIG. 3, the ends 20 of the strip like cathodes 12 are electrically connected to a metal connecting bar 22. A separating member 24 in the form of a strip of electrically insulating material extends under the ends 20 of the cathodes and the connecting bar 22, the free ends 21 of the anodes 10 extending beneath the strip 24. The free ends 21 of the anodes 10, the separating member 24, the connecting bar 22 and the ends 20 of the cathode 12 are all embedded in a water resistant resin 26 which fills the channel section 14. A wire 28 is connected with the connecting bar 22 and extends from the water resistant resin 26 enabling the cathodes 12 to be connected to an electrical power source.

At the other end of the electrode assembly, the electrode arrangement is as illustrated in FIG. 4. At this end of the assembly a metal connecting bar 30 is arranged in the channel section 16, the ends 31 of the inverted V-shaped anodes 10 resting on the connecting bar 30 and being electrically connected thereto by metal connections 32. Above the connecting bar 30 and the ends 31 of the anodes 10 is located a separating member 34 in the form of a strip of insulating material, and the free ends 36 of the cathodes 12 are located above the separating member 34. 136 The connecting bar 30, the ends 31 of the anodes 149 10, the separating member 34 and the free ends 36 of the cathodes 12 are all embedded in a water resistant resin 38 which fills the channel section 16. A wire 40 is connected to the connecting bar 30 and extends from the resin 38 to enable the anodes 10 to be connected to an electrical power source.

In operation a number of electrode assemblies (FIG. 1 or FIG. 2) are immersed in a liquid having some electrical conductivity in suitable juxtaposition and a D.C. supply is connected across the electrodes. The liquid is electrolysed and in the case of an aqueous solution oxygen and hydrogen bubbles will be formed which detach themselves from the electrodes and rise through the liquid. During their movement upwards through the liquid they carry small solid particles with them to the surface and cause these particles to coagulate or coalesce. In a similar way the system can be used to break colloidal suspensions. Utilizing this process it is possible to obtain what is basically a clear liquid having a coagulated sludge on top and sludge which has settled out of suspension at the bottom. The solid matter content of the liquid can be reduced to below 40 ppm. If one or more electrode assemblies are shorted out either by virtue of particles which coagulate and fall down through the liquid or by virute of some metal object falling into the liquid the remaining electrode assemblies can continue in operation until it is convenient to shut down the system to rectify the short circuit either by replacing the offending electrode assembly or simply removing the cause of the short circuit.

It can be seen that the assembly of the invention enables the use of relatively low cost electrodes which have satisfactory resistance to corrosion but at the same time need only have a little mechanical strength. The thermosetting resin offers a method of permanently protecting the electrical connections. The invention also makes it possible to replace electrode assemblies as small items without disrupting the main unit. The electrode assembly of the invention avoids the problem caused by blockage of the known perforated electrodes by leaving a direct path for settling materials to pass through the electrode assembly.

By virtue of utilizing a number of electrode assemblies in series as in an electric battery or accumulator large currents are avoided since the voltage applied is increased while the current is decreased according to the reciprocal of the number of electrode assemblies used. This simplifies connection problems as well as reducing the cost of supplying the necessary electrical power supply to the whole unit.

I claim:
1. A rigid electrode grid structure assembly which includes:
    a. a plurality of anodes composed of elongated metal members,
    b. a plurality of cathodes composed of elongated metal members,
    c. said anodes being alternately arranged in a spaced apart substantially parallel relationship with one another,
    d. a first electrically conductive member and a second electrically conductive member, said members being disposed in a spaced apart parallel relationship with each other, both members being disposed transversely with respect to said anodes and cathodes,
    e. means for joining at least some of said anodes to said first electrically conductive member,
    f. means for joining at least some of said cathodes to said second electrically conductive member,
    g. a first electrical insulating member located adjacent said first electrically conductive member and being disposed so as to separate said first electrically conductive member and the anodes joined to it from the ends of the cathodes, which are not attached to said first electrically conductive member,
    h. a second electrical insulating member located adjacent said second electrically conductive member and being disposed so as to separate said second electrically conductive member and the cathodes joined to it from the ends of the anodes, which are not attached to said second electrically conductive member, i. a first mass of water-resistant synthetic resin material surrounding said first electrically conductive member, said first insulating member and the ends of the anodes and cathodes located adjacent these members, and a second mass of water-resistant synthetic resin material surrounding said second electrically conductive member, said second insulating member and the ends of the anodes and cathodes located adjacent these members, said first and second masses serving to form the entire assembly of cathodes, anodes, conductive members and insulating members into a rigid electrode grid structure, and j. means to supply electrical power to said first and second electrically conducting members.

2. An electrode assembly according to claim 1, wherein the junctions between the anodes and the first electrically conducting member are made inside a first channel section and the junctions between the cathodes and the second electrically connecting member are made inside a second channel section, the channel sections being spaced apart and filled with thermosetting resin.

3. An electrode assembly according to claim 1, wherein at least the anodes are made of a material selected from the group consisting of lead and lead alloys.

4. An electrode assembly according to claim 1, wherein at least the anodes are coated with a material selected from the group consisting of titanium, titanium oxide, a lead alloy, lead dioxide and a thin alloy.

5. An electrode assembly according to claim 1, wherein at least the anodes are coated by spraying.

6. An electrode assembly according to claim 1 wherein at least the anodes are coated by dipping.

7. An electrode assembly according to claim 1, wherein at least the anodes are coated by electrochemical deposition.

8. An electrode assembly according to claim 1, wherein at least the anodes are coated with a material selected from the group consisting of titanium, titanium oxide, a lead alloy, lead dioxide and a tin alloy.

9. An electrode assembly according to claim 8, wherein at least the anodes are coated by spraying.

10. An electrode assembly according to claim 8 wherein at least the anodes are coated by dipping.

11. An electrode assembly according to claim 8, wherein at least the anodes are coated by electrochemical deposition.

12. A plurality of electrode assemblies according to claim 1, wherein the electrode assemblies are arranged side-by-side and wired in series, a spacer or baffle plate being fitted between adjacent assemblies and projecting above the upper surface of the electrode assemblies.

* * * * *